United States Patent [19]

Rolland

[11] 4,345,684
[45] Aug. 24, 1982

[54] ACCUMULATOR CONVEYOR

[75] Inventor: Guy Rolland, Viry Chatillon, France

[73] Assignee: Societe Mecanique Generale et Decolletage Tournage, Evry Cedex, France

[21] Appl. No.: 173,126

[22] Filed: Jul. 28, 1980

[30] Foreign Application Priority Data

Jul. 30, 1979 [FR] France .................. 79 19607

[51] Int. Cl.³ .............................. B65G 13/06
[52] U.S. Cl. ....................... 198/781; 198/790
[58] Field of Search ............... 198/781, 790, 809; 74/571 R, 571 L, 571 M; 474/121, 132, 133

[56] References Cited

U.S. PATENT DOCUMENTS 3,253,097  5/1966  De Good et al. ............. 198/781
3,923,150 12/1975  Jager ..................... 193/35 MD X Primary Examiner—Bruce H. Stoner, Jr.
Assistant Examiner—Paul A. Sobel
Attorney, Agent, or Firm—Frost & Jacobs

[57] ABSTRACT

An accumulator conveyor for transporting intermittent loads is disclosed. Live carrier rollers define a transport surface. A drive belt is disposed subjacent the carrier rollers and brought into friction drive contact therewith by means of pressure rotors having eccentric axes of rotation. Load sensing devices are arranged at spaced locations along the conveyor transport surface between adjacent carrier rollers. Each rotor has a housing with a cylindrical outer wall rotatably mounted about an eccentric axis and containing a pressure roller. The cylindrical walls have angularly spaced apertures through which their pressure rollers protrude. Both of the apertures of a rotor housing are disposed on one side of the diametrical plane passing through the axis of rotation of the rotor. Stop or limit pins extend from one end of the rotors and may rotate depending on the position of notches in control slides linked to the load sensing device in order to operatively connect or disconnect the carrier rollers with the drive belt.

3 Claims, 10 Drawing Figures

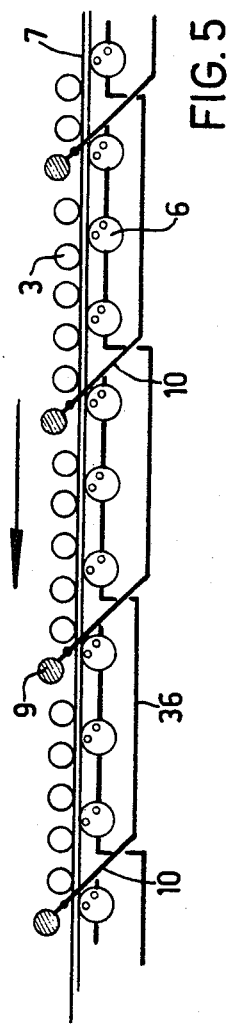
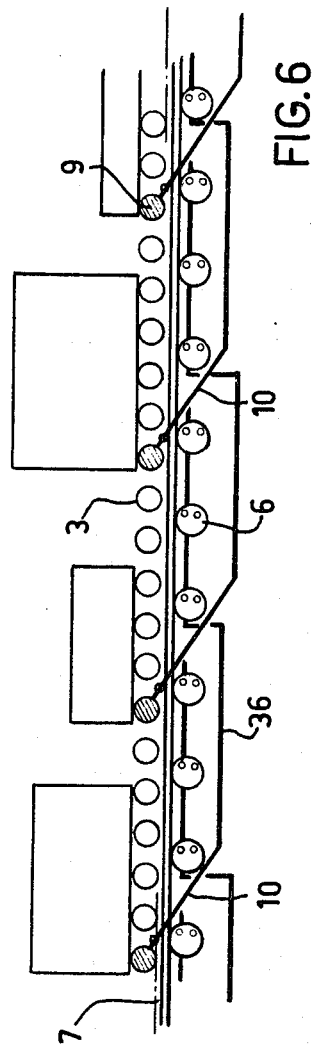
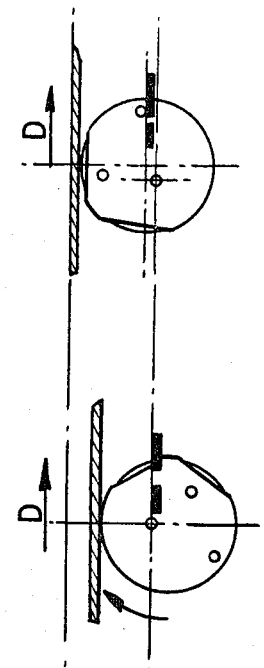
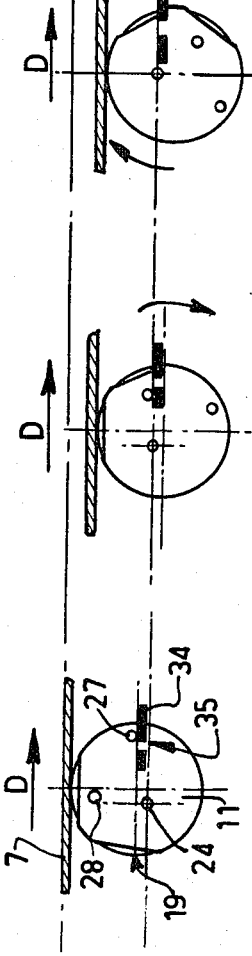

ACCUMULATOR CONVEYOR

FIELD OF THE INVENTION

The present invention relates to an accumulator conveyor for mechanically handling intermittent loads.

BACKGROUND OF THE INVENTION

In order to make the flow of goods transported on a conveyor more uniform when the feed rate is random queues have been developed which fill up and are emptied without it being necessary to stop the conveyor itself.

There are numerous methods of accumulating loads on a conveyor the simpliest of which uses the gravity acting on the loads themselves. The major drawback of this method is that it creates a line pressure proportional to the slope and the total weight of the accumulated loads. If a power conveyor is used and the loads idle on the conveyor a considerable line pressure also results which depends on the friction of the loads on the conveyor.

In accordance with other known methods of accumulation the conveyor is operated intermittently by loading an upstream conveyor while unloading a downstream conveyor, or even by using a number of conveyor modules equal to the number of loads to be accumulated.

Among known accumulator conveyors reference is made to disconnectable conveyors which are automatically disconnectable in response to rollers simultaneously urged by a drive member and blocked by the accumulating loads. The great drawback of these conveyors is that they are difficult to control and require extra thick portions on the driven member to assure the periodic starting of the rollers thereby developing a certain line pressure. There are also conveyors which are disconnectable by load sensing means, these sensing means enable one section of the conveyor to be disconnected when there is a load on it or reconnect this section when the load clears the same. In these devices the connect/disconnect function is accomplished by actuating means which may be pneumatic, electric or even hydraulic. Even though these are high performing devices they have the great drawback of having a prohibitive cost.

On the other hand purely mechanical connect/disconnect systems are generally simpler and therefore more economical and rugged.

Accumulation conveyors of this type have already been disclosed, namely, in French Pat. No. 1,225,981 which describes a conveyor comprising a roller level which bears the load and a central drive belt driving the rollers, the driving of the conveyor being section by section by lifting the belt above the transport surface of the loads so as to bear against the loads, or by lowering below the transport surface, sensing means detecting the presence of loads controlling the device.

The major drawback of this type of conveyor is that it does not accept a very wide range of weights per unit length. In fact the connect/disconnect means is coupled to the sensing means by a set of levers so that there is a linear relation between forces necessary for actuating the sensing means and those which may be exerted by the connect/disconnect unit and the drive belt on the loads to be transported. Consequently, if the sensing means are adjusted so that light loads may be sensed a rather small drive force is obtained which is insufficient for heavy loads transported. Conversely, if the sensing means are adjusted for heavy loads then light loads are not detected by the sensing means.

Improvements in this known accumulator conveyor enable the drawbacks to be obviated by independently adjusting the pressure exerted by the load sensing means and the pressure exerted on the connect/disconnect means of the drive member.

One of these known devices which comprises cams with flats for urging the drive member against the carrier rollers results in very noisy operation owing to the fact that upon each rotation of the cams the drive element moves up and down and strikes the carrier rollers. Further, during load accumulation the drive belt for the carrier rollers rubs against the flats of the cams which consumes energy, wears the belt and increases the force required for reconnecting the mechanism.

With a view to improving this existing accumulator conveyor a double cam system has been developed which is markedly less noisy owing to the fact that the belt is not subjected to a pulsating movement and does not beat against the carrier rollers but during load accumulation the belt still rubs against the flats of the double cam with the aforesaid attendant drawbacks.

SUMMARY OF THE INVENTION

An object of the present invention is therefore the provision of a disconnectable accumulator conveyor in which the pressure to be exerted on the sensing means for detecting the presence of loads is independent of the pressure exerted by the connect/disconnect means of the drive member and which does not have the foregoing drawbacks, i.e. the beating of the drive member which is a source of noise and the rubbing of the drive member against the connect cams which is a source of wear and a loss of energy.

According to the invention there is provided an accumulator conveyor for intermittent loads comprising a frame, a transport surface defined by carrier rollers for bearing and displacing the loads. At least one drive belt is in continuous displacement under the carrier rollers and is adapted to be brought into friction drive relation with respect to the carrier rollers. Pressure rotors having eccentric axes of rotation support the drive belt and are adapted to urge the drive belt against the carrier rollers. Load sensing means are disposed at spaced locations along the transport surface between adjacent carrier rollers. The invention is characterized by each of the pressure rotors having a housing with an outer wall of generally cylindrical configuration rotatably mounted about an eccentric axis. At least one pressure roller is rotatably mounted inside each of the rotor housing. The outer wall of each of the rotor housings having two angularly spaced apertures or windows through which the outer surface of its associated pressure roller protrudes, the apertures both being located on one side of a diametrical plane containing the axis of rotation of its associated pressure rotor.

Preferably one end of each rotor housing comprises two stop pins at different distances from the axis of rotation of the rotor, a control slide being provided with notches and slidably mounted on the frame of the conveyor along the end of the housing having the stop pins of each rotor, the slides being connected to a sensing means by a control linkage for displacing them parallel to the ends of the housing.

The invention will now be described in greater detail with reference to a particular embodiment by way of non limiting example and represented in the accompanying drawings.

BRIEF DESCRIPTION OF THE DRAWINGS

FIGS. 5 and 6 schematically illustrate the operation of the conveyor according to the invention;

FIGS. 7–10 illustrate different positions occupied by the rotor in the course of the drive belt connect and disconnect operations.

DETAILED DESCRIPTION OF THE PREFERRED EMBODIMENTS

Figure 1:
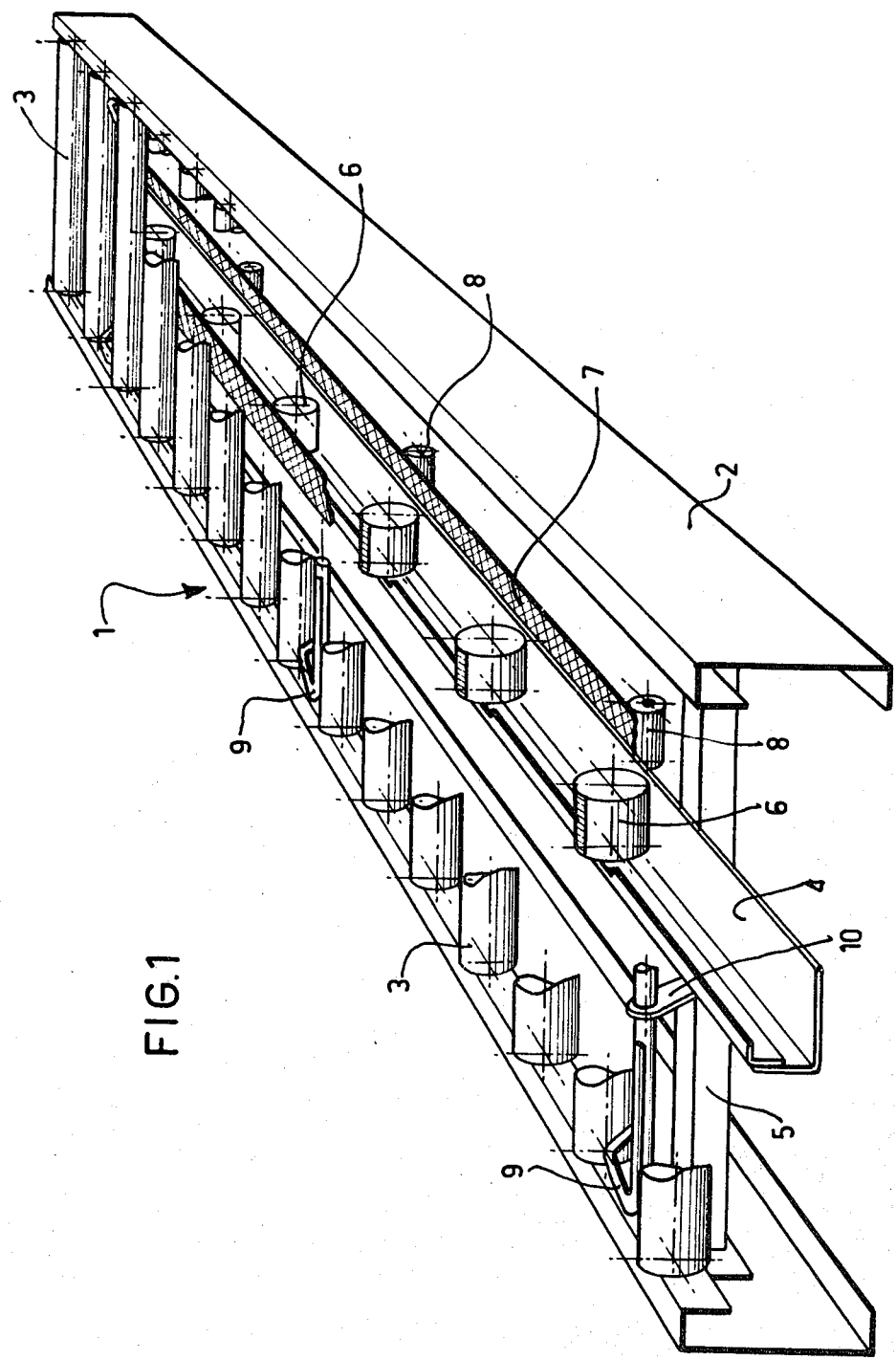
FIG. 1 illustrates a live roller conveyor equipped with belt applying rotors embodying the invention.

As shown in FIG. 1 the live roller accumulator conveyor 1 embodying the invention comprises a conventional frame 2 formed by an assembly of metal beams, a transport surface defined by carrier rollers 3 disposed parallel to one another and freely journaled in bearings carried inside beam members of the frame 2, a central longitudinal beam 4 fixed along cross members 5 of the frame 2 and supporting the rotors 6 for applying the drive belt 7, the drive belt being an endless belt continuously driven by motor means (not shown) and adapted to be brought into friction drive relation with the carrier rollers 3 thereabove by the rotors 6. The belt applying rotors are rotatably mounted about eccentric axes on the central beam 4 parallel to the axes of rotation of the carrier rollers 3. The lower run of the drive belt 7 is supported by idler rollers 8 which prevent the hanging of the belt.

Load sensing means 9 are provided at regularly spaced locations between pairs of adjacent carrier rollers 3. The load sensing means comprise either a simple shoe or a roller mounted at the end of a lever 10 whose swinging causes the displacement of an entire linkage which permits remote control of the lowering of the drive belt 7 out of contact with the carrier rollers 3 or on the contrary its application under the carrier rollers so as to ensure their friction drive.

Figure 2:
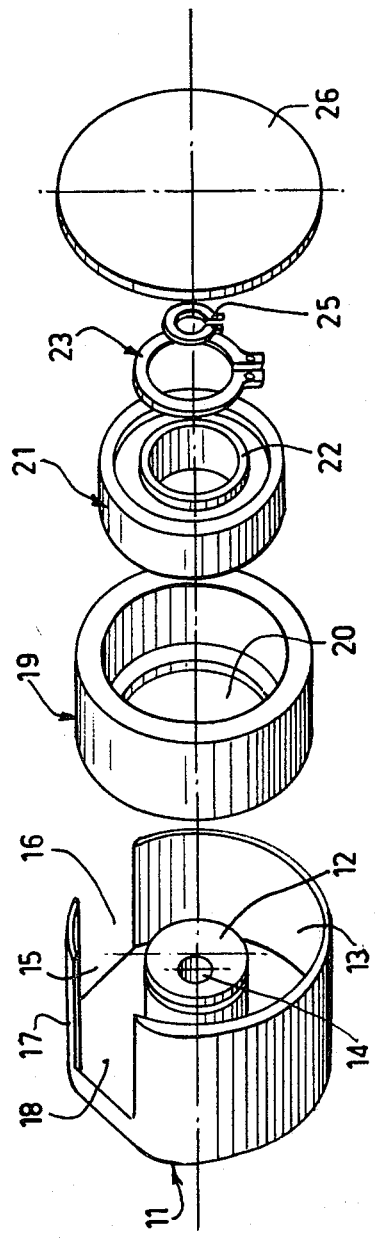
FIG. 2 illustrates an enlarged exploded view of the belt applying rotor.

The essential element of the invention comprises belt-applying rotors 6 of which an exploded view is shown in FIG. 2. Each belt-applying rotor 6 comprises a cylindrical housing 11 provided with a central hub 12 coaxial to the outer cylindrical wall 13 of the housing. The hub 12 comprises an eccentric bore 14 extending therethrough parallel to the axis of the hub.

Figure 4:
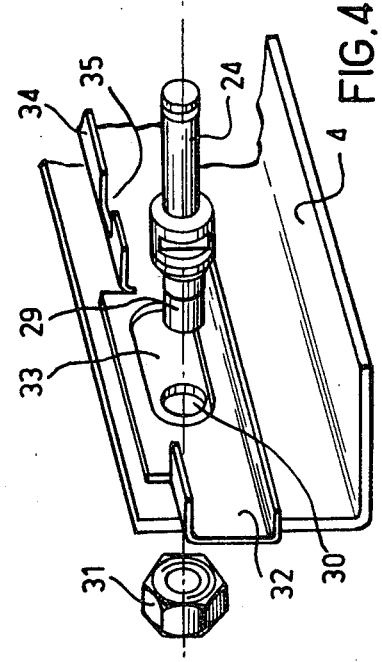
FIG. 4 illustrates the mounting shaft of the rotor on the frame together with the control slide for the rotor.

The approximately cylindrical configuration of the outer wall 13 of the housing is cutout at two spaced locations so as to form two apertures 15 and 16 separated by a wall portion 17. The outer wall 13 is extra thick in the vicinity of the aperture 15, in other words the inner surface of the outer wall 13 is a cylindrical surface of revolution whereas the outer surface is either an eccentric cylindrical surface of revolution so that the thickness between the cylindrical surfaces is a maximum in the vicinity of the edge of the aperture 15 which is farthest from the apertures 16, or a surface of more complex configuration but which results in an extra thickness at the same location. The housing 11 comprises an endwall 18 in which the hub 12 is positioned and it is open on the opposite end to receive a pressure roller 19 having a bore 20 in which is accommodated a ball bearing or other antifriction bearing 21 the inner race 22 of which is fitted on the hub 12 and retained thereon by a clip 23. When the antifriction bearing 21 and the pressure roller 19 is fitted inside the housing 11 the housing is mounted on its mounting shaft 24 (see FIG. 4) in which it is retained by a clip 25 (FIG. 2) and the housing is closed by a cover 26.

On the outer side of the endwall 18 of the housing 11 are provided two stop or limit pins 27 and 28 located at different distances from the axis x-y through the bore 14 in the housing.

Figure 3:
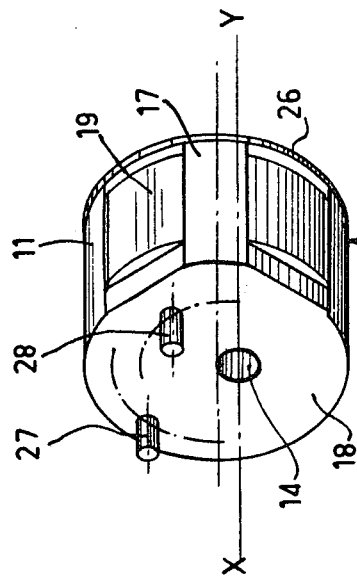
FIG. 3 illustrates a rear perspective view of the rotor shown in FIG. 2.

When the pressure cam or roller 19 is housed in the housing 11 it protrudes through the two apertures 15 and 16 therein as shown in FIG. 3.

Thus assembled the rotor 6 may rotate about its shaft of rotation 24 which traverses the hub 12 inside the eccentric bore 14. The shaft 24 (FIG. 4) has a threaded shank 29 for rigidly fixing it in a hole 30 through a web of the central beam 4, the connection being effected by means of a nut 31 secured on the threaded shank 29. Along the same vertical web of the central beam 4 a control slide 32 bears which is adapted to slide longitudinally along this web parallel to the endwalls 18 of the rotors 6. The control slide 32 comprises slots 33 through which the shafts 24 of the rotors 6 extend, the slide further comprising a right angle flange 34 having a notch large than the diameter of the path of the stop of limit pins 27 and 28 of the rotors 6. When the rotors 6 are mounted on their shafts 24 which are fixed on the central bear 4, the flange 34 of the slide 32 is displaced into the path of movement of the pins 27 and 28 on the rotors and may prevent the rotation of the rotors.

The operation of the present accumulator conveyor is as follows:

When no discrete load is transported on the transport surface of the conveyor (see FIG. 5) the carrier rollers 3 are continuously driven by the driven belt 7 which is urged against the lower sides of the carrier rollers by the pressure or belt applying rollers 6. The sensing means or rollers 9 then protrude up over the transport surface of the conveyor as illustrated in FIG. 5, each sensing roller 9 controlling a set of three rotors 6 by means of a lever 10 and a linkage 36.

When discrete loads are transported by the conveyor (FIG. 6) each load bears on a sensing roller 9 causing the pivoting of the levers 10 associated with the sensing rollers thereby displacing the linkage 36 rearwards, which cause the sliding of the control slide 32 along the vertical web of the central beam 4 of the frame 2, the right-angle flange 34 or the notch 35 of the slide 32 being in the path of movement of the stop or limit pins 27 and 28 of the rotors 6.

The connect/disconnect operation of the belt is more particularly described hereinbelow with reference to FIGS. 7–10 of the drawings.

As illustrated in FIG. 7 the housing 11 of one of the rotors which is rotatably mounted on its eccentric shaft 24 is retained on the web 34 of the slide 32 against which its stop or limit pin 27 abuts. In this position (FIG. 7) the drive belt 7 bears on the pressure roller 19 which protrudes outside the housing 11 through the aperture 16. The belt 7 is driven in the direction of arrow D and the pressure roller 19 revolves without rubbing along the belt thereby eliminating a great part of the wear of the belt. When a discrete load passes a sensing roller 9 the latter is depressed and its lever 10 is swung which pushes its control linkage 30 rearwards which causes the sliding of slide 32 along the central beam 4 and positions the notch 35 in the slide outside the circular path of movement of the pin 27. The slide therefore frees the pin and the rotor housing rotates about its shaft 24 in response to the combined effect of gravity and the weight of the belt 7 which bears on the follower 19. The rotation of the rotor housing 11 is stopped when the second pin 28 abuts the web 34 of the slide 32 owing to the fact that the stop or limit pin 28 rotates at a different radius than pin 28. In this position (FIG. 8) the upper level of the rotor as well as the drive belt 7 is depressed in relation to the lower plane of the carrier rollers 3 of the conveyor whereby the rollers are no longer driven by the drive belt 7 which is out of contact with the lower part. The carrier rollers are thus disconnected from the drive belt and the discrete loads thereon are accumulated.

When it is necessary to cause the displacement of the loads again, a displacement of the slide 32 positions the notch 35 in the path of movement of the second stop or limit pin 28 of the rotor housing whereupon the limit or stop pin 28 may escape and rotor continue his swing under the force of gravity and the weight of the belt 7 which bear thereon (FIG. 9). In this position the belt 7 no longer bears on the pressure roller 19 but bears on the outer wall of the housing 11 and rotates the rotor 6 clockwise rubbing on the periphery of the housing 11. The rotor 6 rotates through three-quarters of a revolution and rises so that it resumes its position in FIG. 7, the belt then bearing again on the pressure roller 19 which is rotated thereby preventing belt wear, the belt being once again lifted to the plane defined by the lowermost portions of the carrier rollers 3 against which it is in driving contact. The carrier rollers are thus operatively connected to the drive belt and the accumulated loads are transported by the conveyor.

It is to be noted that the levers 10 of the sensing means are urged toward their raised position by a return spring not shown.

According to an alternative embodiment which is a little more complicated, two rollers 19 revolving in a single housing 11 are provided, each pressure roller placed in alignment with an aperture in the rotor housing and each carried by a shaft fixed to the endwall 18. This arrangement permits the size of the apertures 15 and 16 to be reduced and thereby makes the intermediate wall portion 17 stronger.

In the device embodying the invention the sensing and connect/disconnect functions are dissociated, the first function serving to control the power take-off from the drive belt to ensure the second function. Power amplification results which permits an elevated maximum weight/minimum weight ratio. Further, whether the carrier rollers are connected to the drive belt, i.e., in the transport phase, or disconnected, i.e. in the accumulation phase, the drive belt 7 rolls on the pressure cams or rollers 19 without rubbing thereon, the pressure cam or roller being in continuous rotation in its raised position as well as its lowered position.

This device is a power take-off device controlled by a low level signal which permits any kind of member to be raised or lowered. For example, in the described embodiment a set of three rotors 6 may be replaced by one rotor and a plurality of idler rollers, these idler rollers may be raised or lowered by another linkage which itself is controlled by the rotation of the remaining rotor. The number of points where the belt 7 is contacted may be increased in number without greatly increasing the cost of the entire unit.

The power picked up by the rotor in its rotational movement may also be used for other functions, e.g., lifting or lowering a terminal stop.

The device and in particular the mode of taking off energy by means of the rotation of the rotor may be used not only in materials handling but in all fields where a great power amplification combined with a limited displacement is required.

Of course the scope of the invention is not limited to the embodiments described above by way of nonlimiting example but it covers all variations, modifications without departing from the scope of the appended claims.

What I claim is:

1. An accumulator conveyor for intermittent loads comprising a frame, a transport surface defined by carrier rollers for bearing and displacing the loads; at least one drive belt in continuous displacement under said carrier rollers and adapted to be brought into friction drive relation with respect thereto; pressure rotors having eccentric axes of rotation supporting said drive belt and adapted to urge said drive belt against said carrier rollers; load sensing means disposed at spaced locations along the transport surface between adjacent carrier rollers; the improvement comprising each of said pressure rotors having a housing with an outer wall of generally cylindrical configuration rotatably mounted about an eccentric axis; at least one pressure roller rotatably mounted inside each of said rotor housings; the outer wall of each of said rotor housings having two angularly spaced apertures through which the outer surface of its associated pressure roller protrudes, said apertures both being located on one side of a diametrical plane containing the axis of rotation of its associated pressure rotor.

2. The conveyor of claim 1, wherein an end of each of said rotor housings has two limit or stop pins disposed at different distances from the axis of rotation of said rotor, and further comprising control slides having notches and being slidably mounted on said frame along the said one end of said rotor housings, each of said control slides being connected to one of said load sensing means by a control linkage for ensuring the displacement of said control slides parallel to said one ends of said rotors.

3. The conveyor of claim 1 or 2, there being a single said pressure roller in each of said rotor housing centered with respect to the outer wall thereof.

* * * * *